US012190120B2

(12) United States Patent
Zargar et al.

(10) Patent No.: US 12,190,120 B2
(45) Date of Patent: Jan. 7, 2025

(54) PROCESSING SYSTEM, RELATED INTEGRATED CIRCUIT, DEVICE AND METHOD

(71) Applicants: STMicroelectronics International N.V., Geneva (CH); STMicroelectronics Application GMBH, Aschheim-Dornach (DE)

(72) Inventors: Asif Rashid Zargar, Greater Noida (IN); Roberto Colombo, Munich (DE)

(73) Assignees: STMicroelectronics Application GMBH, Aschheim-Dornach (DE); STMicroelectronics International N.V., Geneva (CH)

( * ) Notice: Subject to any disclaimer, the term of this patent is extended or adjusted under 35 U.S.C. 154(b) by 74 days.

(21) Appl. No.: 18/312,237

(22) Filed: May 4, 2023

(65) Prior Publication Data

US 2023/0409341 A1    Dec. 21, 2023

(30) Foreign Application Priority Data

Jun. 21, 2022   (IT) ..................... 102022000013099

(51) Int. Cl.
*G06F 9/4401*    (2018.01)
*G06F 21/64*     (2013.01)

(52) U.S. Cl.
CPC ............ *G06F 9/4405* (2013.01); *G06F 21/64* (2013.01)

(58) Field of Classification Search
CPC ............................. G06F 21/64; G06F 9/4405
See application file for complete search history.

(56) References Cited

U.S. PATENT DOCUMENTS

| | | | | |
|---|---|---|---|---|
| 5,860,002 | A * | 1/1999 | Huang ................. | G06F 15/177 709/222 |
| 2006/0064575 | A1* | 3/2006 | Jo ........................ | G06F 9/4403 713/2 |
| 2014/0156984 | A1* | 6/2014 | Roh ..................... | G06F 15/177 713/2 |
| 2023/0099455 | A1* | 3/2023 | Nasim .................. | G06F 9/4403 713/2 |

* cited by examiner

*Primary Examiner* — Terrell S Johnson
(74) *Attorney, Agent, or Firm* — Slater Matsil, LLP

(57) ABSTRACT

In embodiments, a reset management circuit executes reset, configuration, and software runtime phases when a processing system is switched on, where one or more microprocessors start at respective start addresses. During the configuration phase, a circuit reads a boot record from a non-volatile memory and stores it to registers. The circuit sequentially reads data records of configuration data from the non-volatile memory and generates a write request for each data record to store the data of the respective data record to a second circuit with associated address data indicated in the respective data record. The processing system processes the boot record and boot configuration data provided by the second circuits to selectively start a predetermined microprocessor at a default start address or at a start address indicated by the boot configuration data, or start one or more microprocessors at respective start addresses as indicated by the boot record.

20 Claims, 6 Drawing Sheets

PROCESSING SYSTEM, RELATED INTEGRATED CIRCUIT, DEVICE AND METHOD

CROSS-REFERENCE TO RELATED APPLICATIONS

This application claims priority to Italian Application No. 102022000013099, filed on Jun. 21, 2022, which application is hereby incorporated by reference herein in its entirety.

TECHNICAL FIELD

Embodiments of the present disclosure relate to solutions for configuring the boot phase of a multi-core processing system, such as a multi-core microcontroller.

BACKGROUND

FIG. 1 shows a typical electronic system, such as the electronic system of a vehicle, including a plurality of processing systems 10, such as embedded systems or integrated circuits (e.g., a Field Programmable Gate Array (FPGA), a Digital Signal Processor (DSP), or a microcontroller (for example, dedicated to the automotive market)).

For example, in FIG. 1 are shown three processing systems $10_1$, $10_2$, and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to a vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), or a navigation or multimedia audio system. Accordingly, one or more processing systems 10 may implement real-time control and regulation functions. These processing systems are usually identified as Electronic Control Units.

In this respect, future generations of such processing systems 10, e.g., micro-controllers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power, and speed, etc.). For example, more complex multi-core processing systems 10 have recently been proposed. For example, such multi-core processing systems may be used to execute (in parallel) several of the processing systems 10 shown in FIG. 1, such as several vehicle ECUs.

FIG. 2 shows an example of a processing system 10, such as a multi-core processing system. Specifically, in the example considered, the processing system 10 includes one or more processing cores 102, such as a plurality of n processing cores $102_1 \ldots 102_n$, connected to an (on-chip) communication system 114. For example, in the context of real-time control systems, the processing cores $102_1 \ldots 102_n$ may be ARM Cortex®-R52 cores. Generally, the communication system 114 may include one or more bus systems, e.g., based on the Advanced eXtensible Interface (AXI) bus architecture or a Network-on-Chip (NoC).

For example, as shown in the processing core $102_1$, each processing core 102 may include a microprocessor 1020 and a communication interface 1022 configured to manage the communication between the microprocessor 1020 and the communication system 114. Typically, interface 1022 is a master interface configured to forward a given (read or write) request from the microprocessor 1020 to the communication system 114 and forward an optional response from the communication system 114 to the microprocessor 1020. However, the communication interface 1022 may also include a slave interface.

For example, in this way, a first microprocessor 1020 may request a second microprocessor 1020 (via the communication interface 1022 of the first microprocessor, the communication system 114, and the communication interface 1022 of the second microprocessor). Generally, each processing core $102_1 \ldots 102_n$ may include further local resources, such as one or more local memories 1026, usually identified as Tightly Coupled Memory (TCM).

Typically, the processing cores 102 are arranged to exchange data with one or more non-volatile memories 104 or one or more volatile memories 104b. Generally, memories 104 or 104b may be integrated with the processing cores 102 in a single integrated circuit, or memories 104 or 104b may be in the form of a separate integrated circuit and connected to the processing cores 102, e.g., via the traces of a printed circuit board.

Specifically, in a multi-core processing system 10, these are often system memories, i.e., shared for the processing cores $102_1 \ldots 102_n$. For this purpose, communication with memories 104 or 104b may be performed via one or more memory controllers 100 connected to the communication system 114. As mentioned, each processing core 102 may include one or more local memories 1026.

For example, the software executed by the microprocessor(s) 1020 is usually stored in a non-volatile (program) memory 104, such as a Flash memory or EEPROM, i.e., the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data. Conversely, volatile memory 104b, such as a Random-Access-Memory (RAM), may store temporary data.

Often, the processing system 10 also includes one or more (hardware) resources/peripherals 106, e.g., selected from the group of one or more communication interfaces, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, or Ethernet interface, or a debug interface; or one or more analog-to-digital converters or digital-to-analog converters; or one or more dedicated digital components, such as hardware timers or counters, or a cryptographic co-processor; or one or more analog components, such as comparators, sensors, such as a temperature sensor, etc.; or one or more mixed-signal components, such as a PWM (Pulse-Width Modulation) driver.

The resources 106 are usually connected to the communication system 114 via a respective communication interface 1062, such as a peripheral bridge. For example, for this purpose, the communication system 114 may indeed include an Advanced Microcontroller Bus Architecture (AMBA) High-performance Bus (AHB) and an Advanced Peripheral Bus (APB) used to connect the resources/peripherals 106 to the AMBA AHB bus. In general, the communication interface 1062 includes at least a slave interface. For example, in this way, a processing core 102 may send a request to resource 106, and the resource returns the given data. Generally, one or more communication interfaces 1062 may include a master interface.

For example, such a master interface, often identified as integrated Direct Memory Access (DMA) controller, may be helpful in case the resource has to start a communication to exchange data via (read or write) request with another circuit connected to the communication system 114, such as a resource 106 or a processing core 102.

Often such processing systems 10 include one or more general-purpose DMA controllers 110.

For example, as shown in FIG. 2, a DMA controller 110 may be used to exchange data with memory directly, e.g., the memory 104b, based on requests received from resource 106.

For example, in this way, a communication interface may directly read data (via the DMA controller 110) from memory 104b and transmit these data without exchanging further data with a processing unit 102. Generally, a DMA controller 110 may communicate with the memory or memories via the communication system 114 or one or more dedicated communication channels.

In this respect, irrespective of the complexity of the processing system 10 (e.g., concerning the number of processing cores 102 or the number and type of the resources 106), a typical processing system also includes a reset management circuit 116.

For example, such a reset management circuit 116 may be configured to receive one or more reset-request signals RT, such as signal $RT_1, \ldots, RT_m$, indicating a given event. For example, each of the reset-request signals RT may be selected from the group of the reset-request signal provided by a power supply monitoring circuit of the processing system 10, wherein the power supply monitoring circuit asserts the reset-request signal RT when the supply voltage of the processing system ma has been switched on; the reset-request signal provided by a respective reset terminal, such as pins or pads of a respective integrated circuit including the processing system 10; the reset-request signal provided by a processing core 102, in particular a respective microprocessor 1020, configured to assert the respective reset-request signal via software instructions; and the reset-request signal provided by a fault collection and error management circuit configured to assert the respective reset-request signal as a function of one or more error signals ERR, such as error signals provided by a memory controller 100, a processing core 102, a resource 106 or a DMA controller.

In response to the reset-request signal(s) RT, the reset circuit 116 asserts one or more reset signals RST, such as reset signal $RST_1, \ldots, RST_p$. For example, each memory controller 100 may receive a reset signal; each processing core 102 may receive a reset signal; each resource 106 may receive a reset signal; or each DMA controller no may receive a reset signal.

Generally, the reset may be applied to the whole processing system 10 or individual circuits of the processing system 10. For example, to generate a system reset of the processing system 10, the reset management circuit 116 may assert all reset signals RST contemporaneously or according to a given sequence. Conversely, to generate a reset of an individual circuit or a group of circuits, the reset circuit 116 may assert the respective reset signals RST. For example, in response to the reset signal RST, the respective circuit usually resets one or more (and typically all) registers of the respective circuit, thereby bringing the respective circuit into a predetermined condition.

For example, in response to a reset, e.g., when the respective reset signal is de-asserted again, the microprocessor 1020 of a processing core 102 starts the execution of the respective software instructions. As mentioned, the software executed by the microprocessor(s) 1020 is usually stored in the non-volatile program memory 104. Accordingly, in the case of a multi-core processing system using shared memory 104, each microprocessor 1020 is usually configured to start the execution of software instructions from a respective start or start-up address, e.g., an address where the respective boot/start-up code is located. In most processing systems 10, this address is usually different, i.e., univocal, for each microprocessor 1020.

For example, most old microprocessors use fixed start addresses, which implies that the start-up code has to be programmed precisely at this address. Conversely, modern microprocessors 1020 often use a configurable start address, wherein the start addresses of the processing system 10 may be configured in hardware. Moreover, various existing solutions are based on a fixed start address pointing to some initialization/boot software, wherein this initialization/boot software is configured to set up the different main application entry points.

It is observed that the above-described hardware-based solutions often need to be more flexible, robust, and efficient. Conversely, existing software-based solutions might need to comply with the ISO26262 requirement regarding software development and run-time error management, which poses a problem in achieving a target safety level during the initialization/boot software execution.

SUMMARY

In view of the above, various embodiments of the present disclosure provide more flexible solutions for configuring the boot phase of a multi-core processing system.

According to one or more embodiments, the above objective is achieved through a processing system with the features specifically set forth in the following claims. Embodiments, moreover, concern a related integrated circuit, device, and method.

As mentioned before, various embodiments of the present disclosure relate to a processing system, including a plurality of microprocessors. Each microprocessor is configured to start the execution of software instructions starting from a respective start address.

A power-supply monitoring circuit generates a reset request signal when the processing system is switched on in various embodiments. A reset management circuit is configured to receive the reset request signal. Specifically, in response to the reset-request signal, the reset management circuit executes a reset phase, a configuration phase, and a software runtime phase in sequence. Specifically, during the software runtime phase, the processing system is configured to start one or more microprocessors at respective start addresses as a function of boot configuration data.

Specifically, in various embodiments, the processing system includes one or more registers configured to store first boot configuration data, including a boot record. The boot record is configured to indicate one or more microprocessors for each microprocessor to be started at a respective-start address.

Moreover, in various embodiments, the processing system includes a plurality of configuration data client circuits configured to store configuration data. Each configuration data client circuit has associated respective address data, wherein each configuration data client circuit is configured to receive a write request and store data included in the write request to a register of the configuration data client circuit when the write request includes address data corresponding to the address data associated with the configuration data client circuit. Specifically, in various embodiments, one or more configuration data client circuits are configured to provide second boot configuration data. The second boot configuration data indicate whether the processing system should use a default boot configuration or a user-defined boot configuration and a start address.

Accordingly, in various embodiments, one or more non-volatile memories are arranged to store the first boot configuration data, including the boot record at predetermined memory locations and the configuration data in the form of data records, wherein each data record of the configuration data includes the address data associated with one of the configuration data client circuits and the respective data to be stored to the respective configuration data client circuit.

In various embodiments, during the configuration phase, a hardware configuration circuit is thus configured to read the boot record from the predetermined memory locations of one or more non-volatile memories and store the boot record in one or more registers. For example, in various embodiments, the hardware configuration circuit is configured to determine whether the predetermined memory locations have stored a valid boot record and, in response to determining that the predetermined memory locations have stored a valid boot record, read the boot record from the one or more non-volatile memories and store the boot record to the one or more registers.

For example, for this purpose, the hardware configuration circuit may sequentially access a plurality of boot record slots in one or more non-volatile memories until one of the boot record slots has stored a valid boot record.

For example, for this purpose, the hardware configuration circuit may determine whether one or more validity flags of the boot record are asserted.

Moreover, in various embodiments, the hardware configuration circuit is configured to sequentially read the data records of configuration data from one or more non-volatile memories and generate for each data record a respective write request to store the data of the respective data record to the configuration data client circuit having the address data indicated in the respective data record.

Accordingly, in various embodiments, the processing system may start one or more microprocessors as a function of the data stored to one or more registers and the configuration data client circuits. Specifically, in various embodiments, the hardware configuration or reset management circuits are configured to verify whether the second boot configuration data stored to one or more configuration data client circuits indicate that the processing system should use the default boot configuration or a user-defined boot configuration. Moreover, the hardware configuration or reset management circuits are configured to verify whether one or more registers have stored a valid boot record.

For example, in response to determining that the processing system should use the default boot configuration, the processing system may start a predetermined microprocessor at a default start address. For example, the default start address may correspond to a fixed start address or a reset value of the start address provided by the second boot configuration data.

Moreover, in response to determining that the processing system should use the user-defined boot configuration and that one or more registers do not have stored a valid boot record, the processing system may start the predetermined microprocessor at the start address indicated by the second boot configuration data. In this case, a boot firmware may be stored in one or more non-volatile memories, wherein the start address of the boot firmware corresponds to the start address indicated by the second boot configuration data. In this case, the hardware configuration circuit may also be configured to determine whether a start address has been stored in one or more configuration data client circuits. In this case, in response to determining that a start address has been stored in one or more configuration data client circuits, the processing system may start the predetermined microprocessor at the start address indicated by the second boot configuration data. Conversely, in response to determining that a start address has not been stored in one or more configuration data client circuits, the processing system may start the predetermined microprocessor at the fixed start address or the reset value of the start address provided by the second boot configuration data.

For example, in various embodiments, this boot firmware includes software instructions, when executed on the predetermined microprocessor, to read the boot record from one or more registers, analyze the boot record to determine one or more microprocessors to be started and for each microprocessor to be started the respective-start address, and start the one or more microprocessors at the respective start addresses, i.e., the boot firmware may use the boot record to start the respective microprocessors via software instructions.

Conversely, in response to determining that the processing system should use the user-defined boot configuration and one or more registers have stored a valid boot record, the hardware configuration circuit or the reset management circuit may start (directly in hardware) the one or more microprocessors at the respective start addresses as indicated by the boot record stored to the one or more registers.

In various embodiments, the boot record includes for each microprocessor to be started data indicating a respective quantity of data to be verified. In this case, the processing system may be configured to read the respective quantity of data to be verified starting from the start address indicated by the boot record for each microprocessor to be started. Next, the processing system may calculate a hash code, a CRC code, or a signature for the quantity of data read and compare the calculated hash code, CRC code, or signature with an expected reference value. For example, the processing system may assert an error signal when the calculated hash code, CRC code, or signature does not correspond to the expected reference value. For example, this verification may be performed in hardware (before starting a microprocessor) or, when using the boot firmware, via respective software instructions of the boot firmware.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
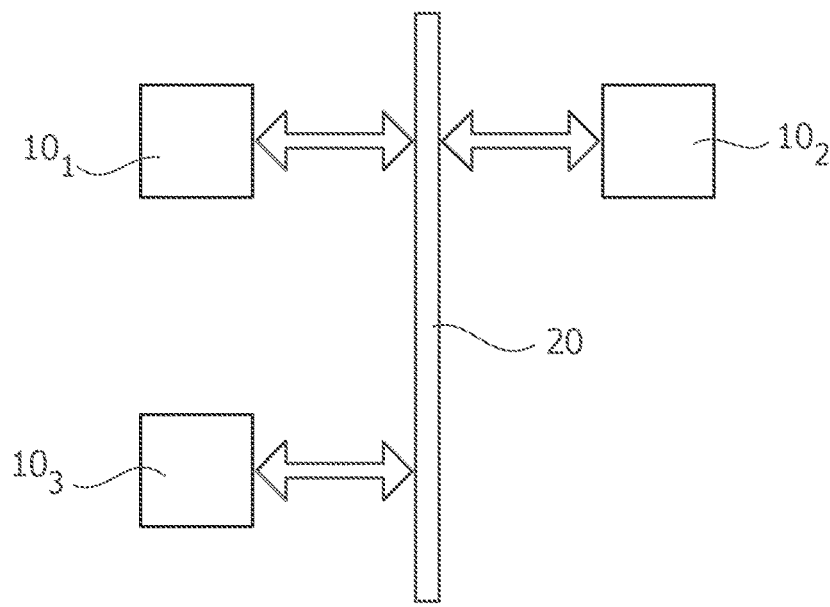
FIG. 1 shows an example of an electronic system including a plurality of processing systems.
Figure 2:
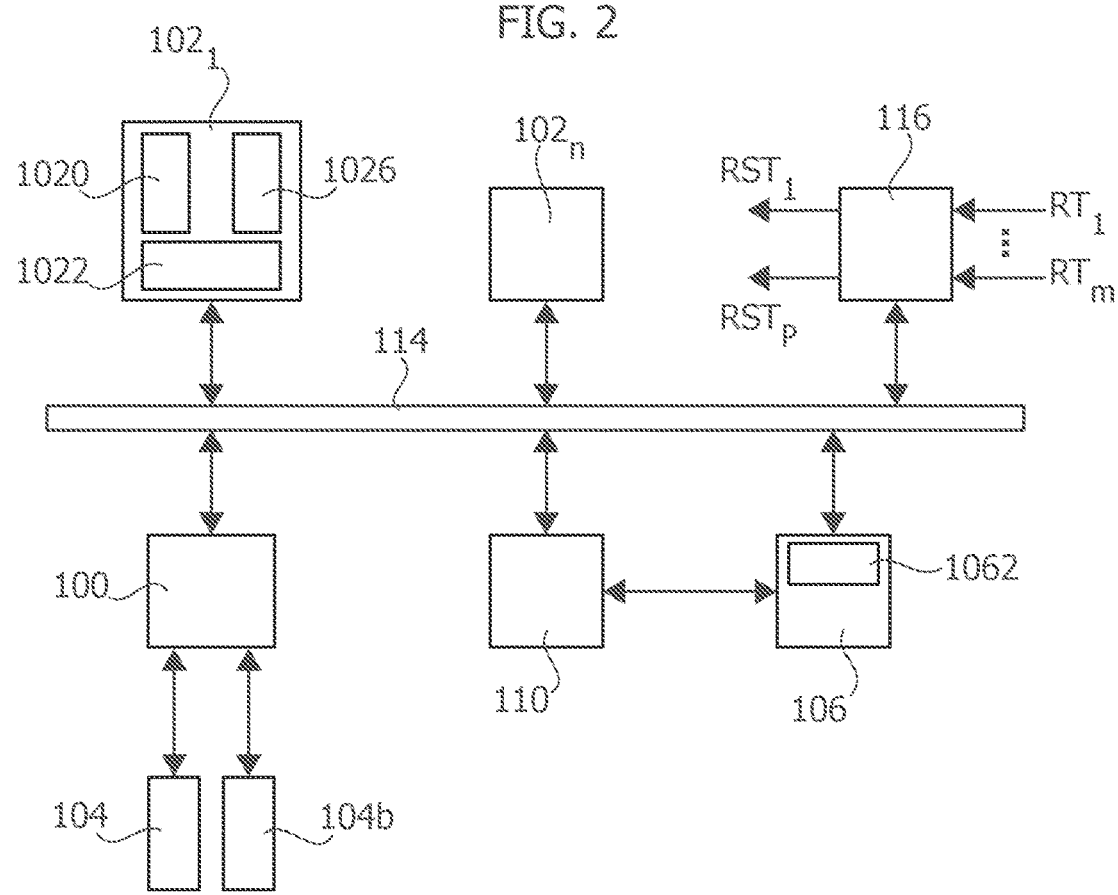
FIG. 2 shows an example of a processing system.

In the following FIGS. 3 to 7 parts, elements or components which have already been described concerning FIGS. 1 to 2 are denoted by the same references previously used in such Figure; the description of such previously described elements will not be repeated in the following in order not to overburden the present detailed description.

As mentioned before, various embodiments of the present disclosure provide solutions for configuring the boot phase of a multi-core processing system. For a general description of a multi-core processing system, reference may be made to the previous description of FIGS. 1 and 2.

Figure 3:
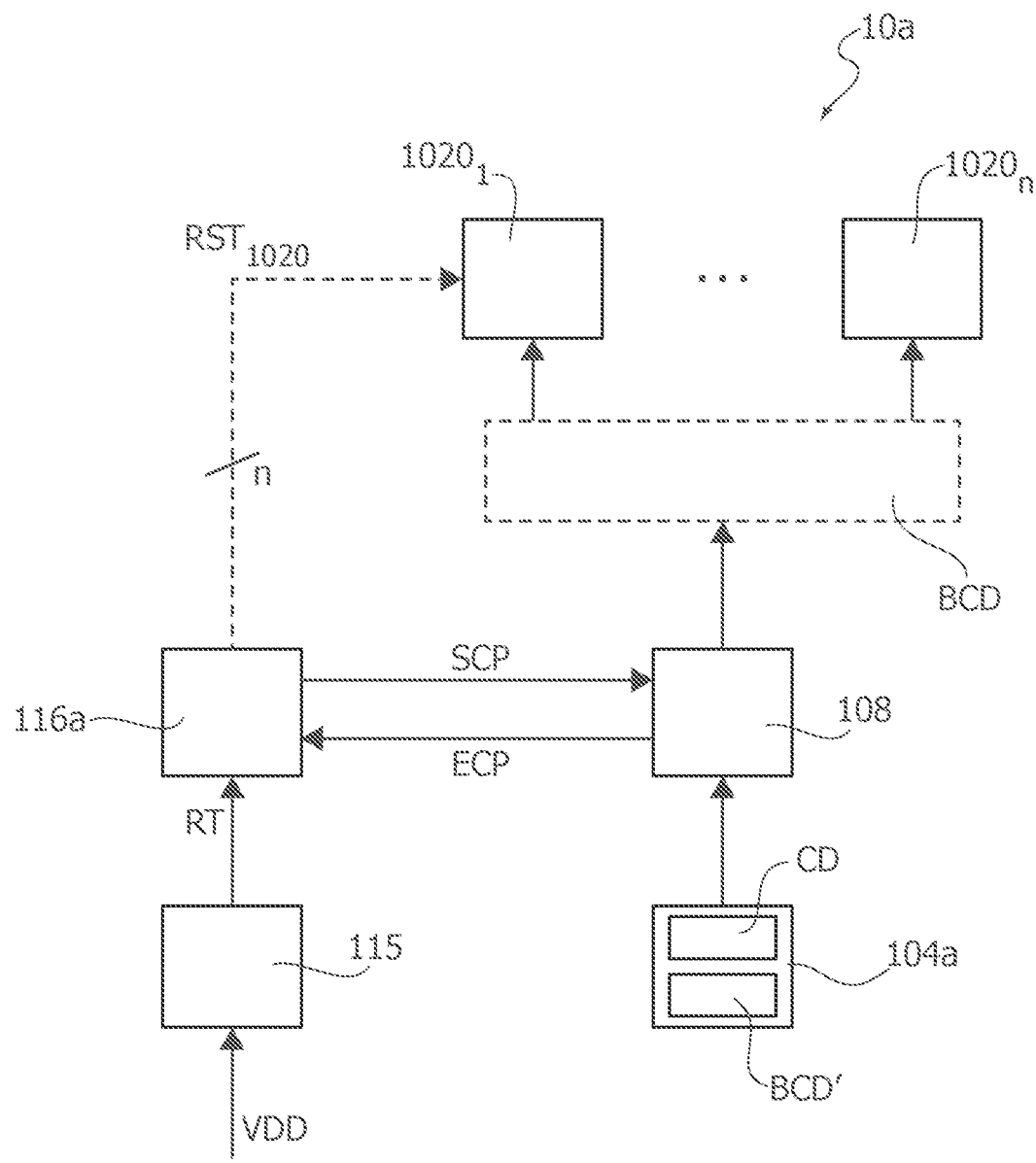
FIG. 3 shows an embodiment of processing system including a hardware configuration circuit and a non-volatile memory having stored boot configuration data.

FIG. 3 shows an embodiment of a multi-core processing system boa according to the present description.

Specifically, in FIG. 3 are shown n microprocessors 1020, i.e., microprocessors $1020_1, \ldots, 1020_n$. As described in FIG. 2, such microprocessors may 1020 may be part of one or more processing cores 102.

In the embodiment considered, the processing system boa includes a reset management circuit 116a. Generally, as described in the foregoing, the processing system boa may also include one or more other circuits, which are not shown in FIG. 3, such as one or more resources 106, one or more DMA controllers no, one or more memory controllers boo, a fault collection and error management circuit, etc.

Specifically, in the embodiment considered, the reset management circuit 116a is configured to receive a reset-request signal RT provided by a power supply monitoring circuit 115. For example, the power supply monitoring circuit 115 may be configured to assert the reset-request signal RT or generate a trigger in the reset-request signal RT when a supply voltage VDD of the processing system boa exceeds a given threshold voltage. Generally, as described in the preceding, the reset management circuit 116a may also receive one or more further reset-request signals, e.g., provided by a reset terminal, a microprocessor 1020, or fault collection and error management circuits.

Accordingly, in response to switching on the processing system boa, i.e., in response to the reset-request signal RT (and possibly other reset-request signals), the reset management circuit 116a is configured to execute the reset procedure. For example, in various embodiments, in response to the reset-request signal(s) RT, the reset management circuit 116 executes (at least) a reset step/phase, where the reset circuit 116a executes a system reset of the processing system boa; and a software runtime phase, where the reset circuit 116a starts one or more microprocessors 1020, which thus start to execute the respective software instructions.

Generally, the reset management circuit 116a may also be configured to execute a more complex reset, e.g., the reset management circuit 116a may execute between the reset step and the software runtime phase, a diagnostic phase, where a diagnostic circuit of the processing system boa executes one or more tests of the processing system ma, and an optional further reset step/phase after the diagnostic phase, where the reset circuit 116 executes a further reset of one or more (or all) circuits of the processing system boa.

Generally, a microprocessor 1020 may be started using a respective reset signal RST 1020 or an additional start signal. For example, when using the reset signal $RST_{1020}$ of the microprocessor 1020, the reset management circuit 116a may be configured to assert the reset signals $RST_{1020}$ during the reset phase (and the optional diagnostic phase and the optional further reset phase) and then de-assert the reset signal $RST_{1020}$ of one or more microprocessors 1020 to be started, thereby starting the software runtime phase. In this case, one of the already started microprocessors 1020 may start another microprocessor 1020, e.g., by sending a request to the reset management circuit 116a to de-assert the respective reset signal $RST_{1020}$ of the further microprocessor 1020 to be started.

Conversely, when using a dedicated start signal, the reset management circuit 116a may be configured to assert the reset signals $RST_{1020}$ for the microprocessors 1020 during the reset phase (and optionally during the diagnostic phase or the further reset phase) and then de-assert the reset signals $RST_{1020}$ of all microprocessors 1020. Next, the reset management circuit 116a may assert the start signal of one or more microprocessors 1020 to be started, thereby starting the software runtime phase. In this case, one of the already started microprocessors 1020 may start another microprocessor 1020 by asserting the respective start signal, e.g., by sending a request to the reset management circuit 116a to assert the respective start signal.

Based on the application, the other circuits of the processing system boa may either be kept under reset or started prior to the software run-time phase. For example, a memory controller 110, a diagnostic circuit, or a fault collection and error management circuit may already be activated/enabled at the end of the (first) reset step.

Accordingly, in the embodiment considered, after the reset procedure is completed, one or more microprocessors 1020 (and typically only one microprocessor 1020) are started. In contrast, other microprocessors 1020 are woken up later through some software or hardware mechanism. The one or more microprocessors 1020 that are started after the reset, which hereafter are also identified as Boot CPU(s), have the task of configuring the whole processing system ma and its application software before one or more of the other microprocessors 1020, which are still under reset or stopped, are woken up. For example, the Boot CPU(s) may run specific software to test some part of the hardware of the processing system boa, such as some safety checks or RAM initialization. In addition, in a processing system ma where safety is important, such as for automotive applications, the start-up/boot phase may guarantee the fault metrics foreseen by the target ASIL level (ASIL-D), as requested by the ISO26262 standard. The Boot CPU hardware and start-up/initialization software should match the same ASIL metric level.

In case the processing system boa includes a hardware security module (HSM), the microprocessor of such an HSM is typically also started after the (first) reset phase, typically at the same time as the Boot CPU(s), and starts executing some code programmed within the HSM module itself. Accordingly, while the description in the following sections focuses mainly on a single Boot CPU, the solutions disclosed herein may also be extended to other microprocessors of the processing system boa, such as an HSM CPU or the start-up of a plurality of microprocessors 1020.

As shown in FIG. 3, in various embodiments, the microprocessors 1020, particularly the one or more microprocessors 1020 (Boot CPUs) to be started at the beginning of the software runtime phase, are configured to use boot configuration data BCD. Specifically, in various embodiments, the processing system boa includes a hardware configuration circuit 108 configured to generate the boot configuration BCD by reading boot configuration data BCD' from one or more non-volatile memories 104a, such as the non-volatile program memory 104. Generally, as will be described in greater detail in the following, the boot configuration data BCD may correspond to the boot configuration data BCD' or the configuration circuit 108 may generate the boot configuration data BCD by processing the boot configuration data BCD'.

Accordingly, in various embodiments, the reset management circuit 116a is configured to execute between the reset step/phase and the software runtime phase, e.g., before the diagnostic phase (when used), a configuration phase. For example, as schematically shown in FIG. 3, the reset management circuit 116a may assert a configuration phase start signal SCP to start the configuration phase. For example, the reset management circuit 116a may assert the signal SCP once the (first) reset step is completed.

Next, the hardware configuration circuit 108 reads the boot configuration data BCD' from the non-volatile memory 104a and generates the boot configuration data BCD.

As shown in FIG. 3, in various embodiments, the hardware configuration circuit 108 may also read further configuration data CD from the non-volatile memory 104a.

Once the hardware configuration circuit 108 has read the boot configuration data BCD' and the optional further configuration data CD, the hardware configuration circuit 108 may assert a configuration phase end signal ECP, signaling the end of the configuration phase. Accordingly, in various embodiments, the reset management circuit 116a may start the next/following phase, e.g., the software runtime phase or the diagnostic phase, in response to determining that the signal ECP is asserted.

For example, the operation of a similar reset management circuit 116a, including the respective phases of the reset procedure and the management of configuration data CD within a processing system, is disclosed in Italian Patent Application No. 102021000007379, which is incorporated herein by reference for this purpose.

Figure 4:
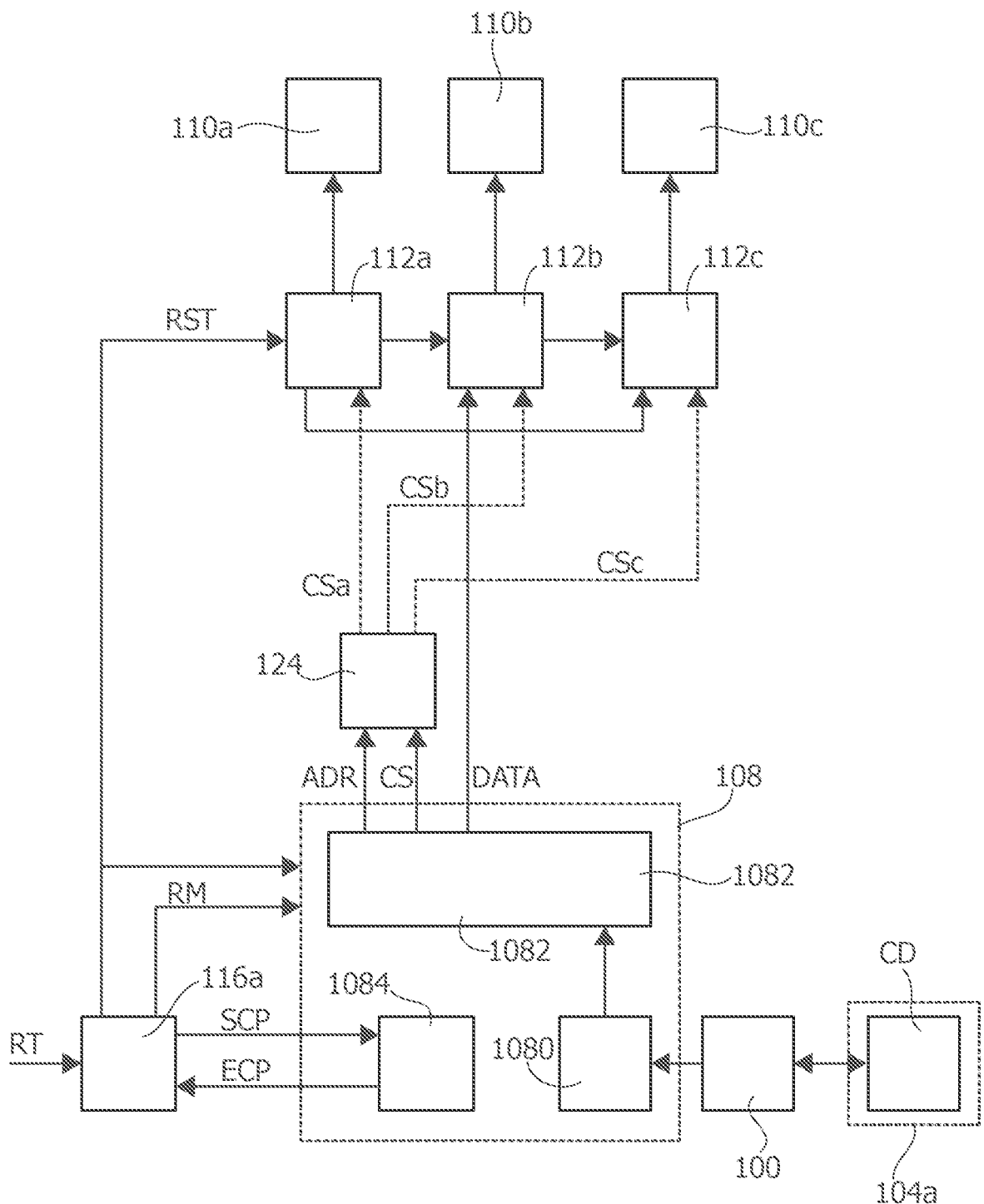
FIG. 4 shows an embodiment of the hardware configuration circuit of FIG. 3.

FIG. 4 shows, in this respect, a possible embodiment of the communication between the configuration module 108 and the configuration data clients 112 in line with the disclosure of document 102021000007379.

Specifically, in the embodiment considered, the hardware configuration module 108 accesses reserved memory areas in a non-volatile memory containing the configuration data CD, reads the configuration data CD, and transmits the configuration data CD to a respective circuit no within the processing system boa. Generally, circuit no may correspond to any circuit of the processing system ma requiring configuration data. It may correspond, e.g., to a processing unit 102/microprocessor 1020, a hardware resource/peripheral 106, the reset management circuit 116a, or a memory controller 100.

Specifically, to distribute the configuration data CD, each circuit no may have associated one or more respective configuration data client circuits 112. For example, in FIG. 4 are shown three circuits 110a, 110b, and 110c and three configuration data clients 112a, 112b, and 112c. Generally, each configuration data client 112 may be associated univocally to a single hardware circuit no and provided configuration data only to the associated hardware block no, e.g., a specific hardware resource 106, or may be associated with a plurality of hardware blocks no, e.g., a plurality of hardware resource 106. In general, the configuration data clients 112a, 112b, and 112c may also be integrated into the respective block 110a, 110b, and 110c.

Accordingly, in various embodiments, the hardware configuration circuit 108, also identified as System Status and Configuration Module (SSCM) in the following, is configured to read the configuration data CD from one or more non-volatile memories 104a and the plurality of configuration data clients 112 are configured to receive respective configuration data CD from the circuit 108 and provide them to the plurality of circuits no requiring configuration data.

For example, in the embodiment considered, the configuration circuit 108 includes a data read circuit 1080 configured to read, e.g., via the memory controller boo, the configuration data CD from memory 104a and a dispatch circuit 1082 configured to transmit the configuration data to the configuration data clients 112.

For example, in various embodiments, the configuration data CD is stored in the form of frames in accordance with a given format, called in the following Device Configuration Format (DCF). For example, in various embodiments, each data frame includes two fields: the payload (i.e., the real data), called DCF Format payload, and possibly additional data attributes used to identify the receiver of the data, called DCF Format attributes, wherein the receiver is one of the configuration data clients 112 representing a DCF client. For example, the data attributes may consist of 16 or 32 bits, wherein a given number of bits specifies the address of one of the configuration data clients 112, and the payload may consist in 16 or 32 bits. For example, in various embodiments, the data read circuit 1080 is configured to read blocks of 64 bits from memory 104a, wherein the first 32 bits contain the data attributes (including the address of a configuration data client), and the second 32 bits have the configuration data to be transmitted to the address specified in the data attributes. In various embodiments, the address may correspond to a physical address of the communication system 114 or a separate communication bus.

In various embodiments, the configuration circuit 108 may also include a state control circuit 1084, e.g., in the form of a sequential logic circuit implementing a finite state machine configured to manage the various configuration phases of the processing system boa.

For example, in line with the previous description, once the processing system boa is switched on (as signaled via the power supply monitoring circuit 115), the reset management circuit 116a of the processing system boa may generate one or more reset signals RST, which are used to perform a reset of the various components of the processing system boa. For example, in the embodiment considered, a reset signal RST may be used by the configuration data client circuits 112 to set the internal register to a respective predetermined reset value.

Similarly, in response to a reset, the reset management circuit 116a may activate, e.g., via the signal SCP, the state control circuit 1084, activating the configuration phase. Specifically, during the configuration phase, the data read circuit 1080 may read the configuration data CD from memory 104. The dispatch circuit 1082 may send the configuration data CD to the various configuration data client circuits 112, thereby overwriting the reset values.

For example, in various embodiments, the dispatch circuit 1082 may generate a data signal DATA having a given number of bits (corresponding to the bits of the payload) containing the configuration data to be transmitted to a target configuration data client 112 and further control signals for selecting the target configuration data client 112. For example, in the embodiment considered, the dispatch module 1082 generates an address signal ADR containing the address of the target configuration data client 112 and optionally a chip select signal CS used to signal that the address signal ADR and the data signal DATA are valid, wherein the respective values of the signals ADR and CS are included in the respective DCF frame.

For example, in various embodiments, the address signal ADR (and the chip select signal CS) may be provided to an address decoder 124 configured to activate/enable one of the configuration data clients 112 as a function of the address signal ADD. For example, in the embodiment considered, the decoder 124 may set a chip select signal CSa to indicate that the respective configuration data client 112a should read the data signal DATA when the address signal ADR corresponds to an address assigned to the configuration data client 112a (and the chip select signal CS is set). Similarly, the decoder 124 may set a chip select signal CSb to indicate that the configuration data client 112b should read the data signal DATA when the address signal ADR corresponds to an address assigned to the configuration data client 112b (and the chip select signal CS is set), etc.

Generally, also a plurality of address decoders 124 may be used. For example, in this case, each circuit no may have associated (e.g., may include) one or more configuration data client circuits 112 and a respective address decoder 124. Accordingly, a plurality of chip select signals CS may be used to enable one of the address decoders 124, e.g., by enabling one of the address decoders 124 when a respective chip select signal CS is asserted, and the address signal ADR may indicate one of the configuration data client circuits 112 managed by the respective address decoder 124. In general, the address data ADR and the optional chip-select data CS are sufficient to indicate univocally one of the configuration data client circuits 112.

Accordingly, in various embodiments, a DCF record is used to "permanently" store in the non-volatile memory 104a a set of configuration data CD to be transferred to a given configuration data client 112. For example, the configuration data CD stored to a configuration data client 112 may consist of bits or bitfields used to determine how a particular piece of logic no should behave among possible different hardware-wired behaviors.

The advantage of such DCF records resides in the fact that these DCF records are stored consecutively, one after the other, in a protected area of the non-volatile memory 104a. Accordingly, the records may be programmed, i.e., appended to the previous records, at different production stages, e.g., the device production at the silicon vendor, the engine control unit production at Tier 1, the system production, and car production.

Specifically, in the embodiment considered, the hardware configuration circuit 108 is configured to read each DCF record from the non-volatile memory 104a and distribute the payload of the DCF record, i.e., the respective configuration data CD, to a target configuration data client 112. As described in the preceding, for this purpose, each DCF record includes data identifying the target configuration data client, such as an address field and one or more optional chip-select bits.

For example, in various embodiments, each DCF record includes 32 bits of configuration data CD and 32 attribute bits, which include 30 bits for identifying the target configuration data clients, such as 16 bits for the chip select signal, e.g., used to select a given address decoder 124 associated with a given target circuit no, and 14 address bits, e.g., used to select a given target configuration data client 112 managed by the selected address decoder 124; an optional parity bit used to protect possible bit flipping of the configuration data CD; and a stop bit used to indicate the last DCF record to be read by the hardware configuration circuit 108.

Because the configuration data CD stored in the DCF records is used to control also fundamental parts of the processing system ma, some security and safety protections might be desirable.

For example, in terms of security, it is advantageous that, after programming the DCF records, these records cannot be altered anymore. This may be achieved by using a processing system ma, configured to protect (at least) the already programmed memory locations of the memory 104a having stored DCF records, thereby inhibiting that the programmed DCF records may be erased or over-programmed. For example, this may be achieved via a one-time or re-programmable non-volatile memory. The respective memory controller 100 inhibits write access to the memory area already storing DCF records.

Moreover, in various embodiments, one or more configuration data client circuits 112 may be configured to store the received data only for the first time. If the configuration data client circuit 112 receives further configuration data (with different content), the first configuration will be maintained. For example, for this purpose, the United States Patent Application Publication No. US 2019/0227747 A1 discloses embodiments of configuration data client circuits 112, wherein the configuration data client may be configured to selectively permit or inhibit the overwriting of already stored configuration data as a function of at least one type identification signal. This document is thus incorporated herein by reference for possible embodiments of the configuration data clients 112.

Conversely, in terms of safety, the configuration data clients 112 may indeed use a plurality of redundant registers, such as triple-voted, e.g., each bit of configuration data CD may be stored to three latched or flip-flops and the output is generated by a two-out-of-three voting of the values stored to the three latches or flip-flops.

In various embodiments, the hardware configuration circuit 108 may also be configured to read possible other system configuration data. Specifically, in various embodiments, these system configuration data are programmed to one or more non-volatile memories 104a, such as the memory 104 or one or more one-time programmable (OTP)

memories. Generally, based on the implementation, such system configuration data may be programmed in part by the producer of the processing system boa and in part by one or more software developers/clients.

Accordingly, in various embodiments, in response to a reset-request RT, the programmed system configuration data are read by the hardware configuration circuit 108, wherein the hardware configuration circuit 108 stores the system configuration data to registers, e.g., implemented with latches or flip-flops.

In various embodiments, the system configuration data include thus the configuration data CD stored as DCF frames and possibly further system configuration data, which may be stored in a dedicated format, such as Life Cycle data, security passwords, or cryptographic keys.

For example, as described above, the configuration data CD stored as DCF frames may be transferred to the configuration data client circuits 112. Conversely, the system configuration data stored in dedicated formats, such as the Life Cycle data, may be stored in one or more registers associated with (e.g., integrated into) the configuration circuit 108.

Accordingly, in principle, each microprocessor 1020 could have associated one or more respective configuration data clients 112, which provide data specifying the start address for the respective microprocessor 1020 or whether the respective microprocessor 1020 should be started at the beginning of the software runtime phase.

However, as mentioned, the DCF records are written to specific areas of the non-volatile memory 104a, typically permanently not-alterable (otherwise, the system configuration could be illegally modified). Moreover, as already described, the DCF record includes data used to indicate the last valid DCF record, such as a bit used to stop the scanning. Accordingly, the DCF records are written in production and then "closed," e.g., by asserting the stop bit of the last DCF record. Any additional DCF record written after the DCF record with the asserted stop bit will thus be ignored. The "closing" of the DCF record list is usually preferable to avoid the system configuration can be illegally modified by appending new DCF record that could supersede the previous programmed value. As a result, if the start address of a microprocessor 1020 is programmed via a DCF record, the start address cannot be altered anymore.

However, in many applications, it would be desirable that the processing system ma is configured to permit a firmware update in the field. However, by using DCF records, the CPU start address could not be updated anymore.

Accordingly, the inventors have observed that it would be preferable to specify the start address for the boot CPU(s) directly in the firmware, whereby the start address(es) may be updated together with the firmware.

For example, in known solutions, the boot configuration data BCD' may include a boot record, which is included directly in the firmware. The boot record includes the start addresses of the microprocessors 1020 and one or more start addresses of the microprocessors 1020 may be updated, e.g., together with the firmware stored in the non-volatile memory 104.

For example, in this case, the processing system boa may be configured to start a predetermined microprocessor/Boot CPU 1020 at a predetermined start address, whereby the respective microprocessor executes a given boot firmware/software. As mentioned, the processing system boa may also be configured to start other microprocessors of the processing system ma, such as a microprocessor of an optional HSM.

For example, the boot firmware may include software instructions to initialize or test one or more circuits of the processing system boa. Moreover, the boot firmware is configured to read the boot record from the non-volatile (program) memory 104.

Specifically, in various embodiments, the boot record includes a set of data used to indicate which microprocessor(s) 1020 should be activated/started after the Boot CPU has completed the execution of the boot firmware and the respective start address for each microprocessor 1020 to be started. Accordingly, after reading the boot record, the boot firmware may include software instructions for configuring the start address of each microprocessor 1020 to start the respective microprocessor or microprocessors 1020.

For example, in various embodiments, the boot record includes the following data optional validity data indicating whether the boot record is valid, such as a boot record valid flag; enable data indicating which microprocessor 1020 should be started, such as a respective boot enable flag for each microprocessor 1020; for each microprocessor 1020 respective boot record data, which permits to specify the start address for the microprocessor 1020, and optional further boot configuration data.

Accordingly, the boot firmware executed by the boot CPU 1020 may use the enable data to determine which microprocessors 1020 should be started. For example, the enable data may be organized as an array of enabled flags/bits, wherein each of the flags indicates whether a specific microprocessor 1020 should be started. In general, instead of processing the boot record via the boot firmware, the respective data may also be processed in hardware, i.e., it is sufficient that the processing system boa is configured to process via software or hardware the boot record to determine which microprocessor 1020 should be started and the respective start address. For example, instead of using the boot firmware, the processing system boa could use the boot record to directly start the indicated microprocessor(s) 1020 at the respective start address, Accordingly, the boot record is written to memory areas of the non-volatile memory 104, which are not one-time programmable and can thus be updated, e.g., by overwriting the boot record. In this way, different from the DCF records, the start address can be updated.

In various embodiments, the previously mentioned optional further boot configuration data may include data indicating a number of bytes or words of software instruction to be verified. Specifically, in this case, the boot firmware may be configured to read the number of bytes or words indicated by the given boot record data, starting from the start address of the boot record data. For example, the boot firmware may be configured to calculate a hash or CRC code for the indicated number of bytes or words or a signature for the indicated number of bytes or words by using a cryptographic key and comparing the calculated code or signature with a respective reference code included in the firmware. For this purpose, the boot firmware may also use an HSM of the processing system ma. The HSM could also use the boot record data to verify the indicated number of bytes or word.

Accordingly, in various embodiments, the processing system boa may be configured to implement via the boot firmware or the HSM, a "secure boot." Specifically, such a "secure boot" is configured to verify that a particular code has not been altered. In this respect, a hash or CRC code permits verifying that the initial firmware data do not contain errors. Conversely, using a signature has the advantage that the software code cannot be altered if the cryptographic key is secret.

Finally, the optional validity data may indicate whether the boot record contains valid data in various embodiments. In this case, a software developer could program multiple boot records to respective memory locations in the non-volatile memory 104 and use the validity data to indicate for each boot record whether the respective boot record is valid. Accordingly, in this way, multiple boot records with different sets of start addresses may be specified, and only one of the boot records may be enabled by programming the respective validity data. Moreover, by using the validity data for multiple boot records, the non-volatile memory may also be a one-time programmable memory. In fact, by using the validity data, the start address(es) may be updated by invalidating a boot record valid flag and appending a new boot record with the updated start address values.

However, the inventors have observed that also such a boot record does not provide sufficient flexibility. For example, as mentioned before, the boot record is either analyzed in hardware or software, and the configuration is fixed. Moreover, when using boot firmware, the respective start address has to be fixed.

Figure 5:
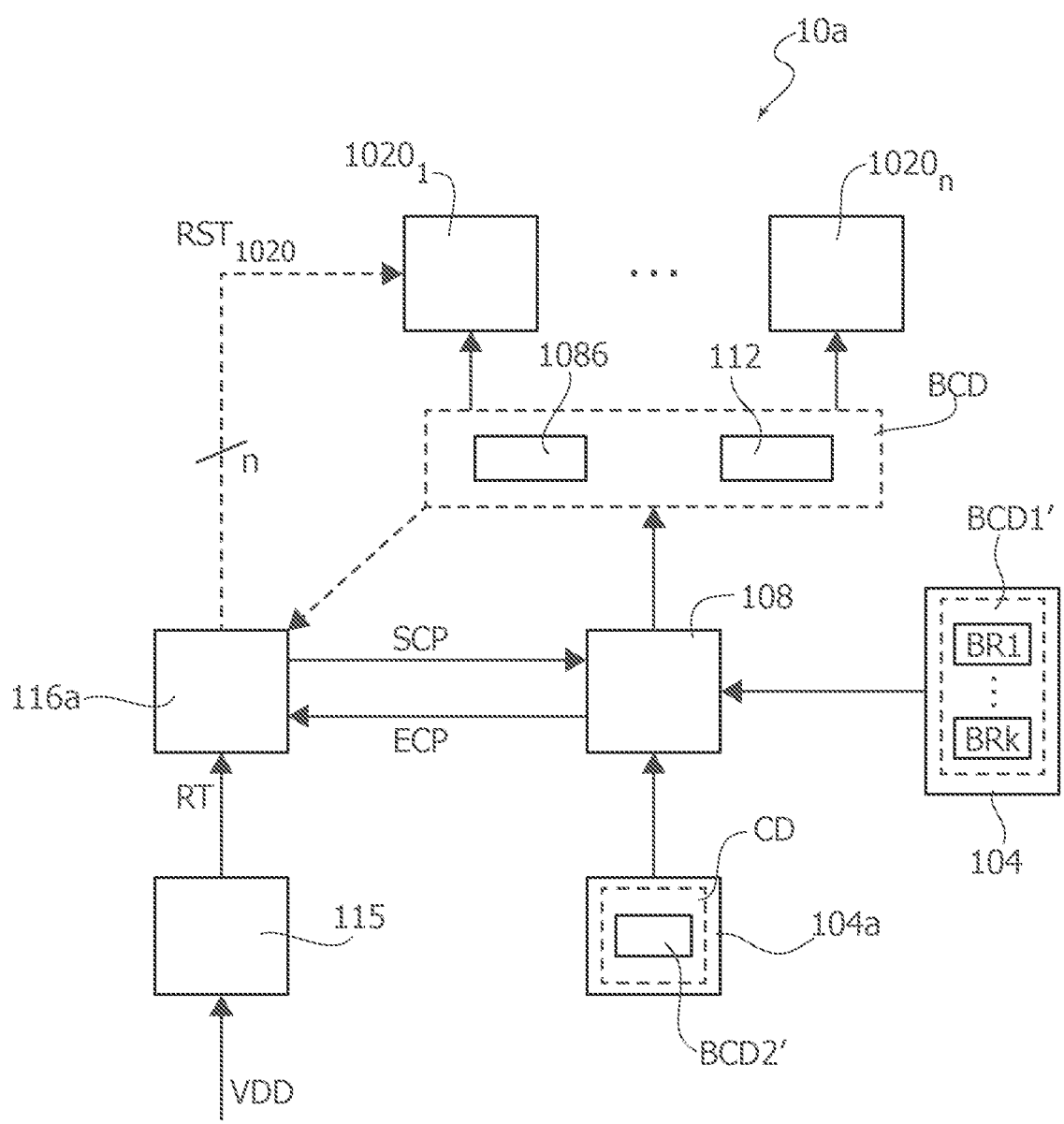
FIG. 5 shows a further embodiment of processing system including a hardware configuration circuit and one or more non-volatile memories having stored boot configuration data.

FIG. 5 shows thus a modified processing system ma. Specifically, concerning the embodiment shown in FIG. 3, the configuration circuit 108 is configured to generate the boot configuration data BCD based of two types of information a first part of boot configuration data BCD1' stored together with the firmware in the non-volatile program memory 104, wherein the boot configuration data BCD1' include one or more boot record slots BR, such as k boot records slots BR1, . . . , BRk, wherein each boot record slots BR is arranged to store a respective boot record; and a second part of boot configuration data BCD2' stored with the configuration data CD in the non-volatile memory 104a, which may also correspond to the non-volatile memory 104, i.e., the boot configuration data BCD1' are stored with the configuration data CD in the form of DCF frames/records.

In the embodiment considered, the hardware configuration circuit 108 is thus configured to read the configuration data CD, including the boot configuration data BCD2', from the non-volatile memory 104a and transfer the configuration data CD to the configuration data client circuits 112. For example, as schematically shown in FIG. 5, the processing system ma may include one or more configuration data client circuits 112, wherein each of these configuration data client circuits 112 has associated a respective univocal address data (such as the address ADR and the optional chip-select data CS), and wherein each of the DCF frames of the boot configuration data BCD2' includes address data identifying one of these configuration data client circuits 112 and the respective boot configuration data BCD2'.

Moreover, in the embodiment considered, the hardware configuration circuit 108 is configured to read the boot configuration data BCD1' from the non-volatile memory 104. If these data may include only a single boot record slot BR, the hardware configuration circuit 108 may read the data stored to the boot record slot BR and store these data in one or more registers 1086 associated with (e.g., integrated into) the configuration circuit 108.

Conversely, in case the boot configuration data BCD1' may include a plurality of boot record slot BR, the hardware configuration circuit 108 may sequentially read the data stored to the various boot record slots BR and analyze the respective data, in particular the validity data of the respective boot record stored to a given slot, to determine the first boot record slot having stored valid boot record data (as indicated by the respective validity data). Accordingly, in this case, the hardware configuration circuit 108 may be configured to store the data of the first boot record slot BR containing valid boot record data to one or more registers 1086.

Accordingly, in the embodiment considered, the data stored to the one or more configuration data clients 112 associated with the boot configuration data BCD1' and the data stored to the one or more registers 1086 correspond to the boot configuration data BCD to be used by the processing system boa to activate one or more of the microprocessors 1020 of the processing system.

Specifically, as will be described in greater detail in the following, the boot configuration data BCD indicates at least one of the microprocessors 1020 to be started and for each of the microprocessors 1020 to be started a respective start address. Accordingly, in various embodiments, the processing system boa, such as the hardware configuration circuit 108, is configured to provide each microprocessor 1020 to start the respective start address and to the reset circuit data indicating that one or more microprocessors 1020 to be started.

Figure 6:
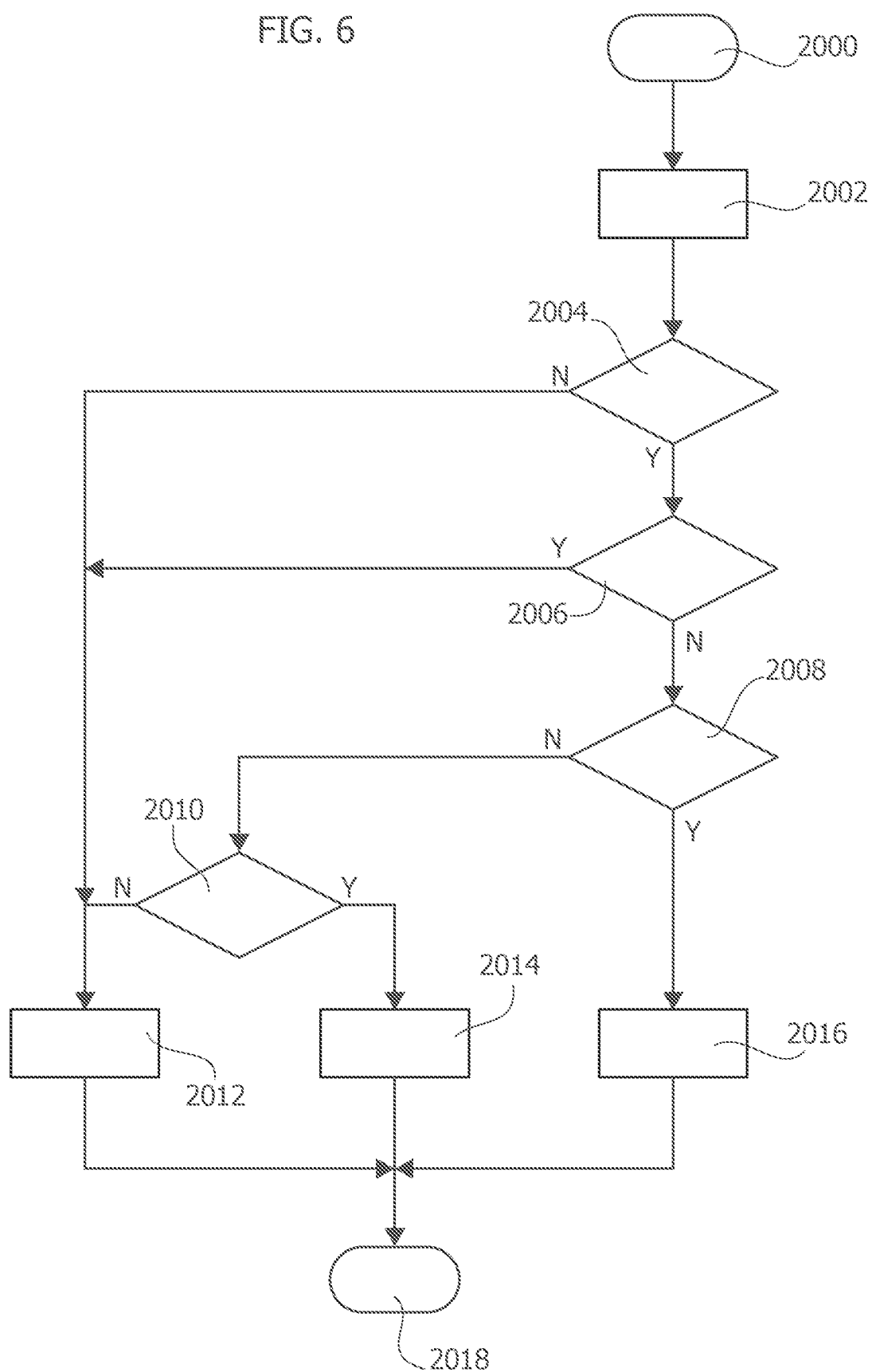
FIG. 6 shows an embodiment of the operation of the processing system of FIG. 5.

FIG. 6 shows an embodiment of the operation of the processing system boa, such as the configuration circuit 108, to determine the start address of one or more microprocessors 1020 to be started as a function of the boot configuration data BCD.

In the embodiment considered, after a start step 2000, which is started, e.g., in response to the signal SCP, the configuration circuit 108 reads at step 2002 during the configuration phase the configuration data CD, which may (or may not) include the boot configuration data BCD2', and at least the first boot record slot BR1 (and possible further boot record slots BR until a valid boot record has been found or all boot record slots have been analyzed).

Accordingly, in various embodiments, the configuration circuit 108 is configured to scan one or more boot record slots BR and determine whether any valid boot record is found. For this purpose, the configuration circuit 108 may analyze the validity data of the boot record slots BR sequentially until the validity data of a boot record slot BR correspond to a predetermined and preferably fixed value.

For example, assuming the processing system ma is configured to use four boot record slots BR, whose addresses in the non-volatile memory 104 are predetermined and preferably fixed, the configuration circuit 108 reads at least the validity data of the first slot BR1 and compares the validity data with the predetermined value. If the validity data correspond to the predetermined value, the configuration circuit 108 may read the other data of the boot record slot BR1 (if not already read) and stop the scanning. Otherwise, the configuration circuit 108 may analyze the data of the next boot record slot.

In various embodiments, the configuration circuit 108 may also be configured to store data, which indicate whether a valid boot record has been found or not, such as a simple flag (a valid boot record has been found or not) or a value indicating the number of the boot record slot BR, whose data have been transferred to the register 1086. Accordingly, in general, the boot configuration data BCD includes the data associated with a boot record, which may or may not include a valid boot record (based on whether at least one of the boot records BR has been programmed).

Similarly, the boot configuration data BCD2' may or may not be programmed. For example, in various embodiments, the processing system boa may include one or more configuration data clients 112 configured to store boot configuration data BCS_CTRL and BCS_ADDR. For example, in various embodiments, the processing system boa includes a first configuration data client circuit 112 configured to store the data BCS_CTRL and a second configuration data client circuit 112 configured to store the data BCS_ADDR. Accordingly, in various embodiments, the configuration data CD may not include any DCF record for the data BCS_CTRL and BCS_ADDR; or include one or more DCF records for the data BCS_CTRL or BCS_ADDR.

In various embodiments, the processing system boa, e.g., the configuration circuit 108, is thus configured to analyze the boot configuration data BCD, which may be programmed or not.

Specifically, in various embodiments, the processing system boa is configured to use the data BCS_CTRL. Specifically, in various embodiments, the data BCS_CTRL indicate whether to use a predetermined/default boot configuration; or a user-defined boot configuration.

For example, in various embodiments, in the default boot configuration, the processing system boa may be configured to start one or more predetermined microprocessors 1020, i.e., boot CPUs.

For example, in various embodiments, the processing system boa is configured to start a single predetermined microprocessor 1020. Accordingly, in this case, the producer of the processing system boa may already store for each microprocessor 1020 to be started a respective boot firmware, also indicated as Boot Code Software (BCS), to a respective given predetermined memory area, also indicated as Boot Code Sector. Accordingly, the default boot configuration may correspond to a configuration in this case. The processing system boa starts each of the one or more predetermined microprocessors 1020 at a start address corresponding to the start address of the respective boot firmware. In various embodiments, the start addresses for one or more predetermined microprocessors 1020 to be started are fixed in hardware. However, in various embodiments, the start addresses for one or more predetermined microprocessors 1020 to be started could also be programmable, e.g., via the data BCS_ADDR.

For example, in various embodiments, the default/reset value of the configuration data client circuit 112 used to store the data BCS_ADDR corresponds to the one or more predetermined/fixed start addresses for the one or more predetermined microprocessors 1020 to be started.

Accordingly, in various embodiments, the processing system boa analyses at step 2006 whether the data BCS_CTRL indicates whether the default boot configuration should be used. Specifically, when the data BCS_CTRL indicates that the default boot record should be used (output "Y" of the verification step 2006), e.g., when one or more flags of the data BCS_CTRL are asserted, the processing system boa may proceed to a step 2012, where the processing system activates the predetermined/default boot configuration, e.g., starts a single microprocessor 1020 at a given fixed start address, e.g., pointing to the factory programmed BCS.

In various embodiments, the processing system boa may also determine at step 2004 whether the data BCS_CTRL are programmed, e.g., by verifying one or more bits of the data BCS_CTRL. Accordingly, in this case, the processing system boa may proceed to step 1012 when the data BCS_CTRL are unprogrammed (output "N" of the verification step 2004) or to the verification step 2006 when the data BCS_CTRL are programmed (output "Y" of the verification step 2004).

For example, this embodiment has the advantage that the producer of the processing system boa may already lock the default boot configuration by programming the data BCS_CTRL (via a respective DCF record), wherein the data BCS_CTRL indicates that the default boot configuration should be used. Specifically, in this case, the configuration data client circuit 112 for the data BCS_CTRL should be configured as a write-once register.

For example, as mentioned before, the United States Patent Application Publication No. US 2019/0227747 A1 discloses embodiments of configuration data clients 112, wherein the configuration data client may be configured to selectively permit or inhibit the overwriting of already stored configuration data as a function of at least one type identification signal.

Conversely, when the data BCS_CTRL indicates that the user-defined boot configuration data should be used (output "Y" of the verification step 2006), e.g., when one or more flags of the data BCS_CTRL are de-asserted, the processing system boa is configured to use at a step 2016 the boot record stored to the register 1086 when a valid boot record has been found. Conversely, when no valid boot record has been found, the processing system ma may start at step 2014 with one or more predetermined microprocessors 1020 at respective start addresses. These start addresses are indicated via the data BCS_ADDR. For example, in various embodiments, the processing system boa may start a single microprocessor 1020 at a start address corresponding to the value of the data BCS_ADDR.

For example, in the embodiment considered, the processing system boa verifies first at step 2008 whether a valid boot record has been found. If a valid boot record has been found (output "Y" of the verification step 2008), the processing system boa proceeds to step 2016.

Conversely, if no valid boot record has been found (output "N" of the verification step 2008), the processing system boa may proceed to step 2014.

In various embodiments, before proceeding to step 2014, the processing system boa may also verify at step 2010 whether the data BCS_ADDR are programmed. Specifically, in this case, the processing system boa may proceed to step 2016, when the data BCS_ADDR are programmed (output "Y" of the verification step 2010). Conversely, the processing system boa may proceed to step 2012, when the data BCS_ADDR are unprogrammed (output "N" of the verification step 2010), using the default boot configuration. Generally, step 2010 is purely optional because the reset value of the data BCS_ADDR may also indicate the start address(es) of the default boot configuration.

Accordingly, steps 2012, 2014, and 2016 are used to select in hardware, e.g., via the configuration circuit 108 and the reset management circuit 116a, one or more microprocessors 1020 to be started and the respective start addresses to be used. Finally, the procedure terminates at a stop step 2018, which, e.g., may be used to assert the signal ECP.

Specifically, in the embodiment considered, if the data BCS_CTRL are unprogrammed, the processing system boa uses at step 2012 the default boot configuration, e.g., start a single predetermined microprocessor 1020 at a fixed start address or the address indicated by the data BCS_ADDR. Similarly, the default boot configuration is used at step 2012 if the data BCS_CTRL is programmed, and the data BCS_CTRL indicates that the default boot configuration should be used.

Conversely, when the data BCS_CTRL are programmed, and the data BCS_CTRL indicate that the user-defined boot configuration should be used, the processing system boa verifies at step 2008 whether a valid boot record has been found. If a valid boot record has been found, the processing system uses step 2016 the boot record, to start one or more microprocessors 1020. Reference can be made to the previous description for a possible embodiment of such a boot record, the possibility to start one or more microprocessors 1020 at respective start addresses, and the possibility of verifying the respective firmware, at least in part. This case permits the flexibility to assign one or more start addresses different from the BCS code. This start address may also be changed because the valid boot record may be changed as well.

Otherwise, if no valid boot record has been found, the processing system boa starts at step 2014 with one or more predetermined microprocessors 1020 at respective start address indicated by the data BCS_ADDR. This case permits the flexibility to assign a start address different from the (default/factory) BCS code, even though the respective address cannot be changed anymore.

As mentioned before, in various embodiments, the default value of the data BCS_ADDR corresponds to the one or more default start addresses of the BCS code, whereby the one or more predetermined Boot CPUs start from a valid address, which corresponds to the start address of the (default) BCS code, even when the data BCS_ADDR are unprogrammed.

Moreover, in the embodiment considered, the boot record slots BR are already analyzed at step 2002. However, the processing system boa may also be configured to analyze the boot record slots BR between the verification steps 2006 and 2008, i.e., once the processing system determines that a user-defined boot configuration should be used.

As mentioned before, the processing of the boot configuration data BCD may be implemented in any suitable manner within the processing system boa, e.g., within the hardware configuration circuit 108 or the reset management circuit 116*a*. For example, based on the data BCD, the hardware configuration circuit 108 may provide to each microprocessor 1020 a respective start address signal and to the reset management circuit 116*a* data/signals indicating which of the microprocessors 1020 should be started, such as the previously mentioned reset signals or start signals.

In various embodiments, the processing system boa permits access to (at least part of) the boot configuration data BCD via software instructions executed by one or more (and possibly all) microprocessors 1020. For example, for this purpose, register 1086 and configuration data clients 112 may be connected to communication system 114.

As described in the preceding, at step 2016, the boot record is used to directly start one or more microprocessors 1020 at respective start addresses in hardware. Conversely, when using a boot configuration with (default or user) BCS, the BCS may be configured to determine whether a valid boot record was found, and in response to determining that a valid boot record was found, use the boot record stored to the register 1086 to start (via software instructions) the respective one or more microprocessors at the respective start address as indicated by the boot record.

Conversely, if no valid boot record was found, the BCS may stop the software execution or remain in a loop waiting for possible instructions, e.g., received via a communication interface. Alternatively, the BCS may try to start the microprocessors 1020 at fixed and predetermined start addresses.

In conclusion, a software developer has the flexibility to start from the BCS code, programmed by the producer of the processing system boa, or a custom user-defined code, with the option to have the start-up code at a fixed address (via the data BCS_ADDR) or changeable (via the boot record slots).

As mentioned before, in various embodiments, the configuration data CD and the boot record(s) BR are stored in predetermined memory areas in memory 104 or 104*a*. Accordingly, the processing system boa may limit write access to these memory areas to ensure that the boot configuration data BCD1' and BCD2' may not be altered.

In various embodiments, the processing system boa may also be configured to monitor possible errors in the boot configuration data BCD1' or BCD2', or hardware errors in one or more of the circuits used to generate the boot configuration data BCD.

For example, in this respect, the United States Patent Application Publication No. US 2020/169459 A1, which is incorporated herein by reference for this purpose, discloses the possibility of associating with each DCF configuration data frame respective error detection or correction data ECC; or including in the configuration data CD itself one or more error detection data, such as parity bits, whereby the configuration data client 112 may include an error detection circuit configured to verify the bits stored to the respective register of the configuration data client 112.

Moreover, the United States Patent Application Publication No. US 2019/0258493 A1, incorporated herein by reference for this purpose, discloses that signature data, such as a hash code, may be stored in the non-volatile memory 12 for all configuration data CD.

Figure 7:
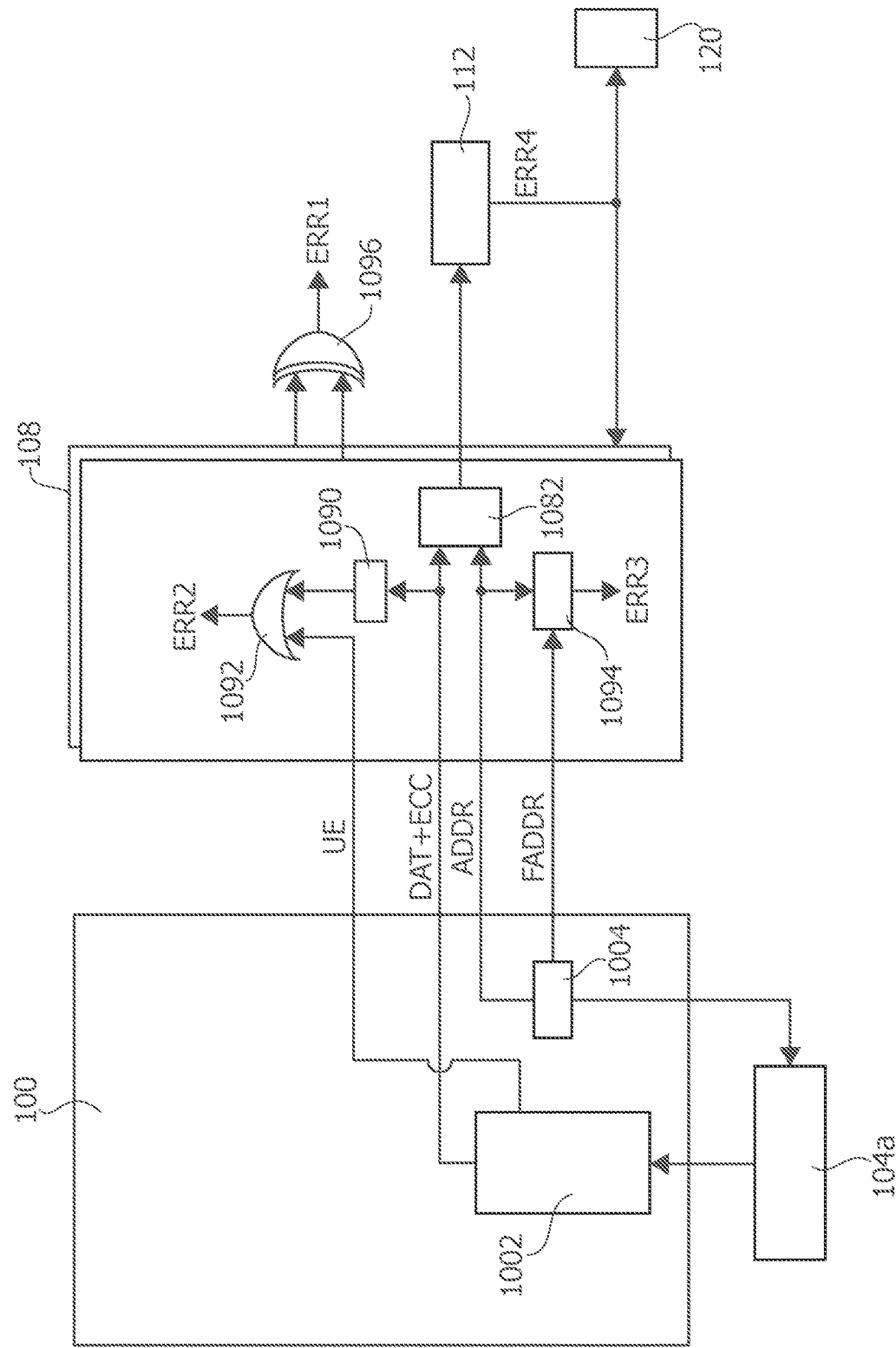
FIG. 7 shows an embodiment of the hardware configuration circuit and a non-volatile memory.

For example, FIG. 7 shows an embodiment of a processing system boa configured to verify the correctness of the data read from a non-volatile memory 104*a*, which may include the configuration data CD or the boot record slots BR.

In the embodiment considered, the processing system boa may include various error detection mechanisms, which may be used individually or in combination.

In various embodiments, the first mechanism duplicates the configuration circuit 108. For example, the output signals of the first configuration circuit 108 may be connected to the other circuits, such as the memory controller boo, the configuration data clients 112, etc. In contrast, the second configuration circuit 108 may receive the same input signals as the first configuration circuit 108.

Accordingly, in the embodiment considered, a combinational logic circuit 1096, e.g., including one or more XOR gates, may be configured to assert an error signal ERR1 when a given signal generated by the first configuration circuit 108 does not correspond to the respective signal generated by the second configuration circuit 108.

While FIG. 7 is schematically shown only a single signal, indeed, the combinational logic circuit 1096 is preferably configured to compare all signals generated by the configuration circuits 108, such as the signals used to read data from the non-volatile memory 1*o*8*a*, such as an address signal ADDR, or more complex signals when read requests have to be routed through the communication system 114; the signals used to transfer the data to the configuration data client circuits 112; and possibly other signals used to indicate other data of the boot configuration data BCD.

Accordingly, in the embodiment considered, when the combinational logic circuit 1096 does not detect a mismatch/an error, the (first) configuration circuit 108 operates correctly, which implies, e.g., that the signals used to read data, in particularly the boot configuration data BCD1' and BCD2', from the non-volatile memory, such as the address signal ADDR, are generated correctly; and the data are transmitted accurately to the DCF client circuit 112.

In various embodiments, a second mechanism verifies the integrity of the data read from the non-volatile memory 104a. For example, as well-known, memory 104a may be an Error Correction Code (ECC) memory, wherein the memory stores, in addition to given data DAT also, respective ECC bits.

For example, in FIG. 7, the memory controller boo includes error detection and optionally correction circuit 1002 configured to receive the data bits DAT and ECC bits read from the non-volatile memory 104a and verify whether the bits have errors. For example, in various embodiments, circuit 1002 may be configured to assert an error signal UE when the bits DAT and ECC contain an error that was not corrected or could not be corrected.

For example, when using only an error detection circuit 1002, the error detection circuit 1002 may assert the signal UE when an error is detected. Conversely, when using an error detection and correction circuit, circuit 1002 may assert the signal UE when an error is detected. Still, circuit 1002 could not correct the error, such as a double-bit error, when using a Single-Error Correction (SEC) and Double-Error Detection (DEC) ECC code.

Accordingly, in various embodiments, the processing system boa may be configured to assert an error signal ERR2 when the signal UE is asserted, i.e., when the bits read from memory 104a contain an error and the error cannot be repaired.

However, in various embodiments, the memory controller boo provides the data bits DAT and the ECC bits to the configuration circuit 108. Accordingly, in various embodiments, the configuration circuit 108 may include further error detection and optional correction circuit 1090, which, e.g., may have the same structure as circuit 1002. Accordingly, circuit 1090 may verify the operation of circuit 1002.

For example, in this case, a combinational logic circuit 1092, such as an OR gate, may be configured to assert the error signal ERR2 when circuit 1002 detects an error in the bits read from memory 104a, and the error was not repaired; or the circuit 1090 detects an error in the bits read from memory 104a, and the error was not repaired.

Generally, not only the data read from memory 104a may be corrupted, but also the address used to read the data may be corrupted. For example, in FIG. 7, the memory controller 100 includes a register 1004 used to store, e.g., latch, the address signal ADDR. Accordingly, the signal used to read data from memory 104a could be incorrect due to defects in the connection between the configuration circuit 108 and the memory controller 100 or in register 1004.

In various embodiments, a third mechanism verifies the correctness of the address provided to the non-volatile memory 104a. For example, register 1004 may be configured to provide a feedback signal FADDR corresponding to the stored address signal used to read data from the non-volatile memory 104a. Accordingly, in this way, a comparator circuit 1094, e.g., integrated in the configuration circuit 108, may be configured to assert an error signal ERR3 when the address ADDR sent by the configuration circuit 108 and does not correspond to the loopback feedback address FADDR.

In various embodiments, a fourth mechanism verifies the correctness of the data stored in the configuration data client circuits 112. For example, as described in the preceding, for this purpose, the configuration data client circuits 112 may be configured to verify one or more error detection bits, such as one or more parity bits, in the data transmitted to the data client circuits 112, or the configuration circuit 108 may receive as feedback the data stored by the configuration data client circuits 112. For example, schematically shown in FIG. 7, a configuration data client 112 may assert an error signal ERR4 based on one or more parity bits.

In general, the error signal ERR1, ERR2, ERR3, or ERR4, may be stored to software readable registers or provided to a fault collection and error management circuit 120 of the processing system 10a.

Accordingly, the solutions disclosed in the preceding permit configuring the system start-up/boot configuration flexibly and robustly.

The solutions may be applied to a single boot CPU 1020, whose boot firmware may then configure the processing system boa and start one or more of the other microprocessors 1020, possibly using for this purpose the boot record stored to the register 1086. The solutions may also be applied to multiple boot CPUs in case plural (or all) microprocessors should be started. The solutions may be used to start the processing system boa with multiple configurations, ranging from silicon vendor test, to controlled start-up through BCS, or customer-specific start-up code.

Moreover, by adopting the additional control mechanisms, such as the firmware verification (as described concerning the boot record data) and the additional error detection mechanisms, the solution may comply with the ISO26262 ASIL-D requirement.

Of course, without prejudice to the principle of the invention, the details of construction and the embodiments may vary widely concerning what has been described and illustrated herein purely by way of example, without thereby departing from the scope of the present invention, as defined by the ensuing claims.

What is claimed is:

1. A processing system, comprising:
a power supply monitoring circuit configured to generate a reset request signal in response to the processing system being turned ON;
a plurality of microprocessors, each configured to start execution of instructions in accordance with a start address;
a reset management circuit configured to receive the reset request signal and, in response, sequentially execute a reset phase, a configuration phase, and a software runtime phase, wherein the processing system is configured to start execution of instructions by a microprocessor as a function of boot configuration data;
a register configured to store a first boot configuration data, the first boot configuration data including a boot record indicating which one of the microprocessors is to be started and a respective start address;
a plurality of configuration data client circuits configured to store configuration data, each configuration data client circuit having an address data, each configuration data client circuit configured to receive a write request and configured to store data included in the write request to a register of the configuration data client circuit in response to the write request having an address data corresponding to the address data associated with the configuration data client circuit, wherein a configuration data client circuit is configured to provide a second boot configuration data indicating a start address and whether the processing system is to use a default boot configuration or a user-defined boot configuration;
a non-volatile memory configured to store the first boot configuration data at predetermined memory locations, the first boot configuration data being stored in the form of data records, each data record of the first boot configuration data having an associated address of a configuration data client circuit and an associated data to be stored at the configuration data client circuit; and a hardware configuration circuit configured to:
- read the boot record from the predetermined memory locations,
- store the boot record to the register,
- sequentially read the data records of the first boot configuration data from the non-volatile memory, and
- generate a respective write request for each data record, the write request being used to store data of the data record to the configuration data client circuit with the address data indicated in the data record, wherein the hardware configuration circuit and the reset management circuit are configured to:
- start a predetermined microprocessor at a default start address in response to determining that the second boot configuration data indicates that the processing system is to use the default boot configuration,
- start a microprocessor at the start address as indicated by the boot record stored to the register in response to determining that the second boot configuration data indicates that the processing system is to use the user-defined boot configuration and the registers have stored a valid boot record, and
- start the predetermined microprocessor at the start address indicated by the second boot configuration data in response to the determining that the second boot configuration data indicates that the processing system is to use the user-defined boot configuration and the registers do not have a valid boot record.

2. The processing system of claim 1, wherein, during the configuration phase, the hardware configuration circuit is configured to read the boot record from the non-volatile memory and store the boot record to the register in response to determining that the predetermined memory locations have stored a valid boot record.

3. The processing system of claim 2, wherein determining that the predetermined memory locations have stored a valid boot record comprises sequentially accessing a plurality of boot record slots in the non-volatile memory until a boot record slot has stored a valid boot record.

4. The processing system of claim 2, wherein determining that the predetermined memory locations have stored a valid boot record comprises determining whether a validity flag of the boot record is asserted.

5. The processing system of claim 1, wherein the default start address corresponds to a fixed start address or a reset value of the start address indicated by the second boot configuration data.

6. The processing system of claim 5, wherein, during the configuration phase, the hardware configuration circuit is configured to:
- determine whether a start address has been stored to a configuration data client circuit;
- start the predetermined microprocessor at the start address indicated by the second boot configuration data at the fixed start address in response to determining that the processing system is to use the user-defined boot configuration, the register does not have a valid boot record, and a start address has been stored to a configuration data client circuit; and
- start the predetermined microprocessor at the fixed start address or the reset value of the start address indicated by the second boot configuration data in response to determining that the processing system is to use the user-defined boot configuration, the register does not have a valid boot record, and the start address has not been stored to a configuration data client circuit.

7. The processing system of claim 1, wherein a boot firmware comprising software instructions is stored in the non-volatile memory, a start address of the boot firmware corresponding to the start address indicated by the second boot configuration data, the software instructions, when executed by the predetermined microprocessor, cause the predetermined microprocessor to:
- read the boot record from the register;
- determine a microprocessor that is to be started and a respective start address for the microprocessor to be started; and
- start the microprocessor at the respective start address.

8. The processing system of claim 1, wherein the boot record comprises a quantity of data to be verified by each microprocessor, the processing system configured to:
- read the quantity of data to be verified from the start address indicated by the boot record for the microprocessor to be started;
- calculate a hash code, a cycle redundancy check (CRC) code, or a signature for the quantity of data read; and
- assert an error signal in response to the hash code, the CRC code, or the signature failing to correspond with an expected reference value.

9. The processing system of claim 1, wherein the hardware configuration circuit is a first hardware configuration circuit, and
wherein the processing system includes a second hardware configuration circuit and a combinational logic circuit configured to assert a first error signal in response to the first hardware configuration circuit failing to have the same output signal as the second hardware configuration circuit, or
wherein the non-volatile memory provides data bits and error correction code bits, and wherein the second hardware configuration circuit includes an error correction and detection circuit configured to assert a second error signal in response to the data bits and the error correction code bits having an uncorrectable error, or
wherein the non-volatile memory is configured to receive an address signal from the second hardware configuration circuit and provide a feedback to the second hardware configuration circuit, and wherein the second hardware configuration circuit is configured to assert a third error signal in response to the address signal provided by the second hardware configuration circuit not corresponding to the feedback.

10. An integrated circuit comprising a processing system, the processing system comprising:
- a power supply monitoring circuit configured to generate a reset request signal in response to the processing system being turned ON;
- a plurality of microprocessors, each configured to start execution of instructions in accordance with a start address;
- a reset management circuit configured to receive the reset request signal and, in response, sequentially execute a reset phase, a configuration phase, and a software runtime phase, wherein the processing system is configured to start execution of instructions by a microprocessor as a function of boot configuration data;
- a register configured to store a first boot configuration data, the first boot configuration data including a boot record indicating which one of the microprocessors is to be started and a respective start address;

a plurality of configuration data client circuits configured to store configuration data, each configuration data client circuit having an address data, each configuration data client circuit configured to receive a write request and configured to store data included in the write request to a register of the configuration data client circuit in response to the write request having an address data corresponding to the address data associated with the configuration data client circuit, wherein a configuration data client circuit is configured to provide a second boot configuration data indicating a start address and whether the processing system is to use a default boot configuration or a user-defined boot configuration;

a non-volatile memory configured to store the first boot configuration data at predetermined memory locations, the first boot configuration data being stored in the form of data records, each data record of the first boot configuration data having an associated address of a configuration data client circuit and an associated data to be stored at the configuration data client circuit; and a hardware configuration circuit configured to:
  read the boot record from the predetermined memory locations,
  store the boot record to the register,
  sequentially read the data records of the first boot configuration data from the non-volatile memory, and
  generate a respective write request for each data record, the write request being used to store data of the data record to the configuration data client circuit with the address data indicated in the data record, wherein the hardware configuration circuit and the reset management circuit are configured to:
  start a predetermined microprocessor at a default start address in response to determining that the second boot configuration data indicates that the processing system is to use the default boot configuration,
  start a microprocessor at the start address as indicated by the boot record stored to the register in response to determining that the second boot configuration data indicates that the processing system is to use the user-defined boot configuration and the registers have stored a valid boot record, and
  start the predetermined microprocessor at the start address indicated by the second boot configuration data in response to the determining that the second boot configuration data indicates that the processing system is to use the user-defined boot configuration and the registers do not have a valid boot record.

11. The integrated circuit of claim 10, wherein, during the configuration phase, the hardware configuration circuit is configured to read the boot record from the non-volatile memory and store the boot record to the register in response to determining that the predetermined memory locations have stored a valid boot record.

12. The integrated circuit of claim 11, wherein determining that the predetermined memory locations have stored a valid boot record comprises sequentially accessing a plurality of boot record slots in the non-volatile memory until a boot record slot has stored a valid boot record.

13. The integrated circuit of claim 11, wherein determining that the predetermined memory locations have stored a valid boot record comprises determining whether a validity flag of the boot record is asserted.

14. The integrated circuit of claim 10, wherein the default start address corresponds to a fixed start address or a reset value of the start address indicated by the second boot configuration data.

15. A device comprising a plurality of processing systems, each processing system comprising:

a power supply monitoring circuit configured to generate a reset request signal in response to the processing system being turned ON;

a plurality of microprocessors, each configured to start execution of instructions in accordance with a start address;

a reset management circuit configured to receive the reset request signal and, in response, sequentially execute a reset phase, a configuration phase, and a software runtime phase, wherein the processing system is configured to start execution of instructions by a microprocessor as a function of boot configuration data;

a register configured to store a first boot configuration data, the first boot configuration data including a boot record indicating which one of the microprocessors is to be started and a respective start address;

a plurality of configuration data client circuits configured to store configuration data, each configuration data client circuit having an address data, each configuration data client circuit configured to receive a write request and configured to store data included in the write request to a register of the configuration data client circuit in response to the write request having an address data corresponding to the address data associated with the configuration data client circuit, wherein a configuration data client circuit is configured to provide a second boot configuration data indicating a start address and whether the processing system is to use a default boot configuration or a user-defined boot configuration;

a non-volatile memory configured to store the first boot configuration data at predetermined memory locations, the first boot configuration data being stored in the form of data records, each data record of the first boot configuration data having an associated address of a configuration data client circuit and an associated data to be stored at the configuration data client circuit; and a hardware configuration circuit configured to:
  read the boot record from the predetermined memory locations,
  store the boot record to the register,
  sequentially read the data records of the first boot configuration data from the non-volatile memory, and
  generate a respective write request for each data record, the write request being used to store data of the data record to the configuration data client circuit with the address data indicated in the data record, wherein the hardware configuration circuit and the reset management circuit are configured to:
  start a predetermined microprocessor at a default start address in response to determining that the second boot configuration data indicates that the processing system is to use the default boot configuration,
  start a microprocessor at the start addresses as indicated by the boot record stored to the register in response to determining that the second boot configuration data indicates that the processing system is to use the user-defined boot configuration and the registers have stored a valid boot record, and start the predetermined microprocessor at the start address indicated by the second boot configuration data in response to the determining that the second boot configuration data indicates that the processing system is to use the user-defined boot configuration and the registers do not have a valid boot record.

16. The device of claim 15, wherein the device is a vehicle, and wherein each processing system in the plurality of processing systems is coupled using a communication system.

17. The device of claim 15, wherein, during the configuration phase, the hardware configuration circuit is configured to read the boot record from the non-volatile memory and store the boot record to the register in response to determining that the predetermined memory locations have stored a valid boot record.

18. The device of claim 17, wherein determining that the predetermined memory locations have stored a valid boot record comprises sequentially accessing a plurality of boot record slots in the non-volatile memory until a boot record slot has stored a valid boot record.

19. The device of claim 17, wherein determining that the predetermined memory locations have stored a valid boot record comprises determining whether a validity flag of the boot record is asserted.

20. A method for operating a processing system, the method comprising:
    generating, by a power supply monitoring circuit of the processing system, a reset request signal in response to the processing system being turned ON;
    having a plurality of microprocessors in the processing system, each microprocessor to start execution of instructions in accordance with a start address;
    receiving, by a reset management circuit of the processing system, the reset request signal and, in response, sequentially executing a reset phase, a configuration phase, and a software runtime phase, wherein the processing system is to start execution of instructions by a microprocessor as a function of boot configuration data;
    storing, by a register of the processing system, a first boot configuration data, the first boot configuration data including a boot record indicating which one of the microprocessors is to be started and a respective start address;
    storing, by a plurality of configuration data client circuits of the processing system, configuration data, each configuration data client circuit having an address data;
    receiving, by a configuration data client circuit, a write request;
    storing, by the configuration data client circuit, data included in the write request to a register of the configuration data client circuit in response to the write request having an address data corresponding to the address data associated with the configuration data client circuit;
    providing, by the configuration data client circuit, a second boot configuration data indicating a start address and whether the processing system is to use a default boot configuration or a user-defined boot configuration;
    storing, by a non-volatile memory, the first boot configuration data at predetermined memory locations, the first boot configuration data being stored in the form of data records, each data record of the configuration data having an associated address of a configuration data client circuit and an associated data to be stored at the configuration data client circuit; and
    reading, by a hardware configuration circuit, the boot record from the predetermined memory locations;
    storing, by the hardware configuration circuit, the boot record to the register;
    sequentially reading, by the hardware configuration circuit, the data records of the first boot configuration data from the non-volatile memory;
    generating, by the hardware configuration circuit, a respective write request for each data record, the write request being used to store the data of the data record to the configuration data client circuit with the address data indicated in the data record;
    starting, by the hardware configuration circuit and the reset management circuit, a predetermined microprocessor at a default start address in response to determining that the second boot configuration data indicates that the processing system is to use the default boot configuration,
    starting, by the hardware configuration circuit and the reset management circuit, a microprocessor at the start addresses as indicated by the boot record stored to the register in response to determining that the second boot configuration data indicates that the processing system is to use the user-defined boot configuration and the registers have stored a valid boot record, and
    starting, by the hardware configuration circuit and the reset management circuit, the predetermined microprocessor at the start address indicated by the second boot configuration data in response to the determining that the second boot configuration data indicates that the processing system is to use the user-defined boot configuration and the registers do not have a valid boot record.

* * * * *